Aug. 18, 1970     A. M. HURKMANS ET AL     3,524,575
ELECTRIC STAPLING MACHINE
Filed March 30, 1967     9 Sheets-Sheet 2
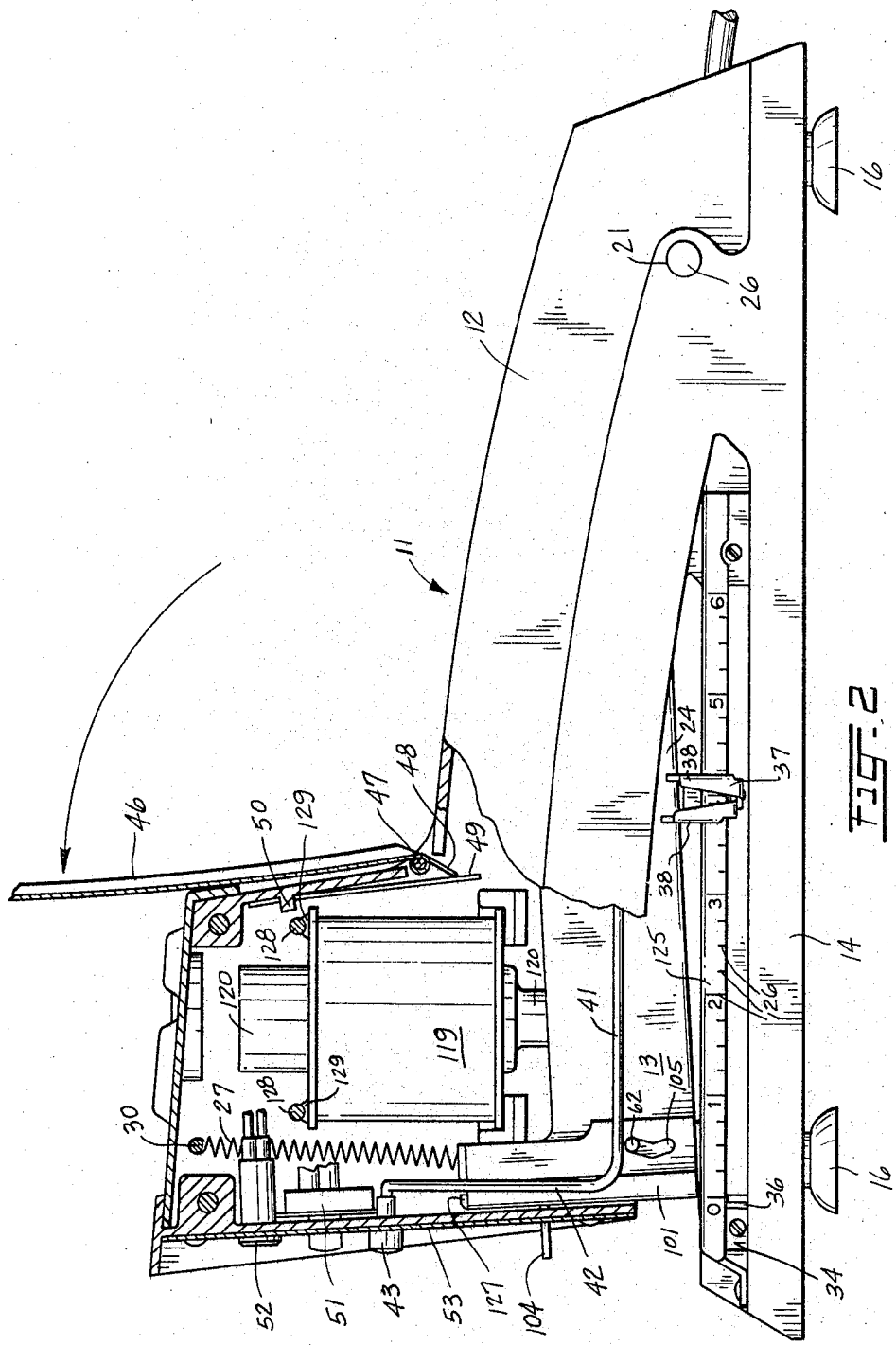
INVENTORS
Antoon M. Hurkmans
BY Menachem Futter
Attorney

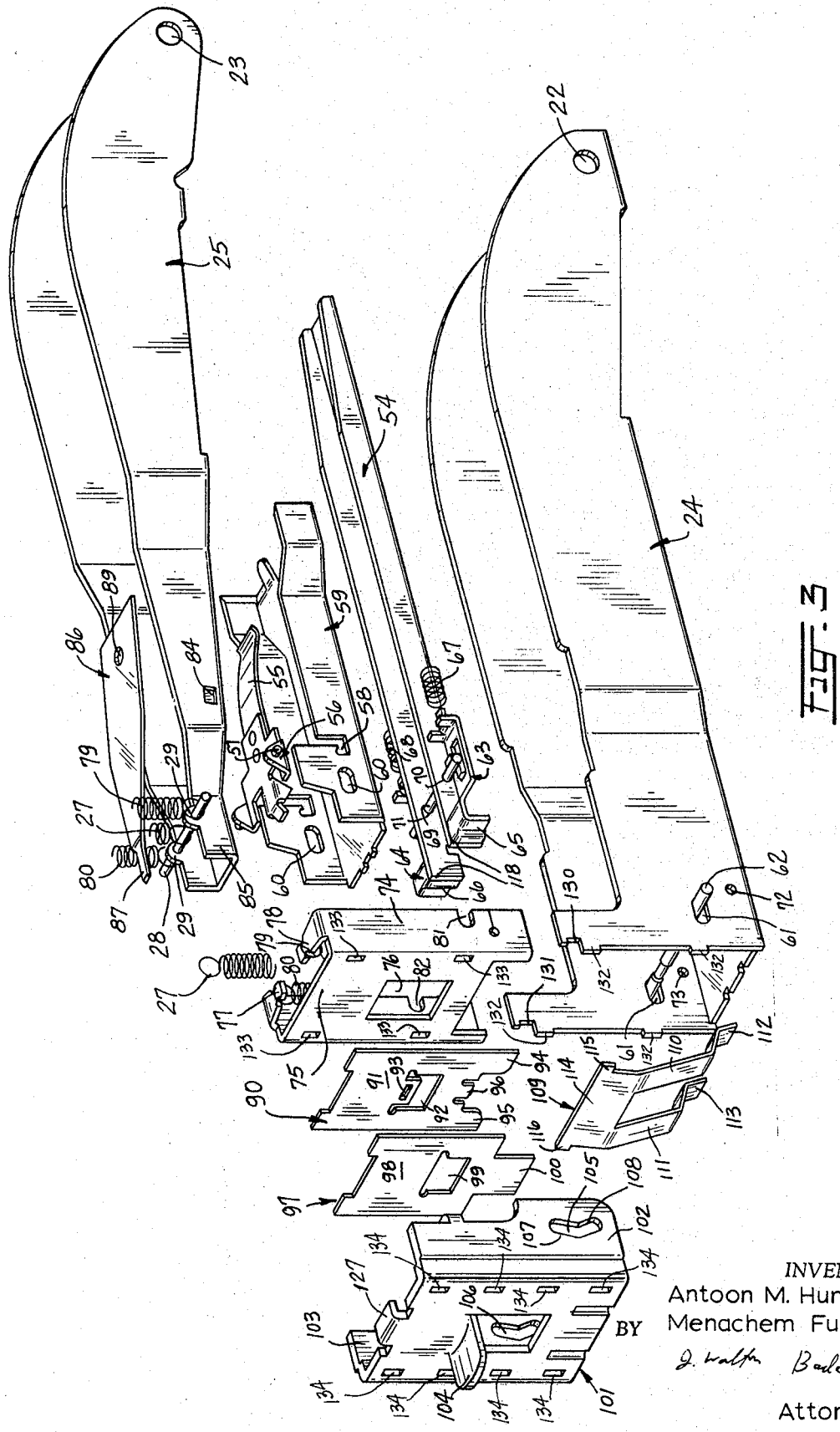

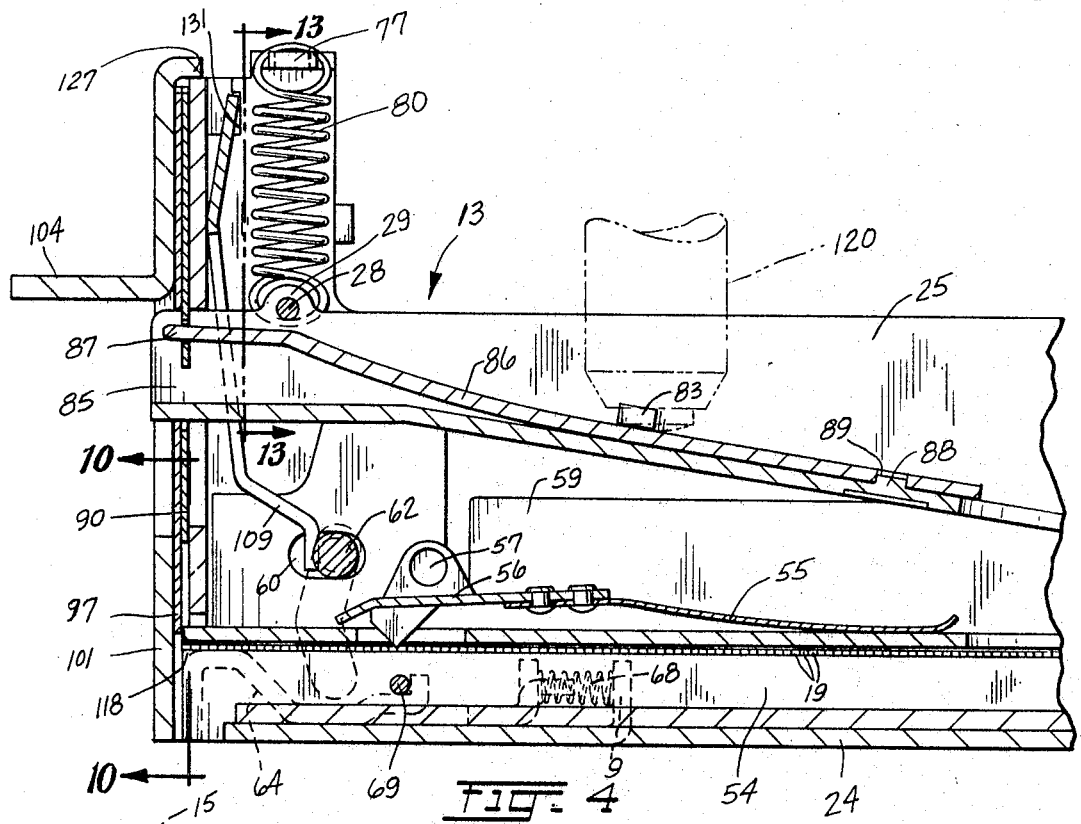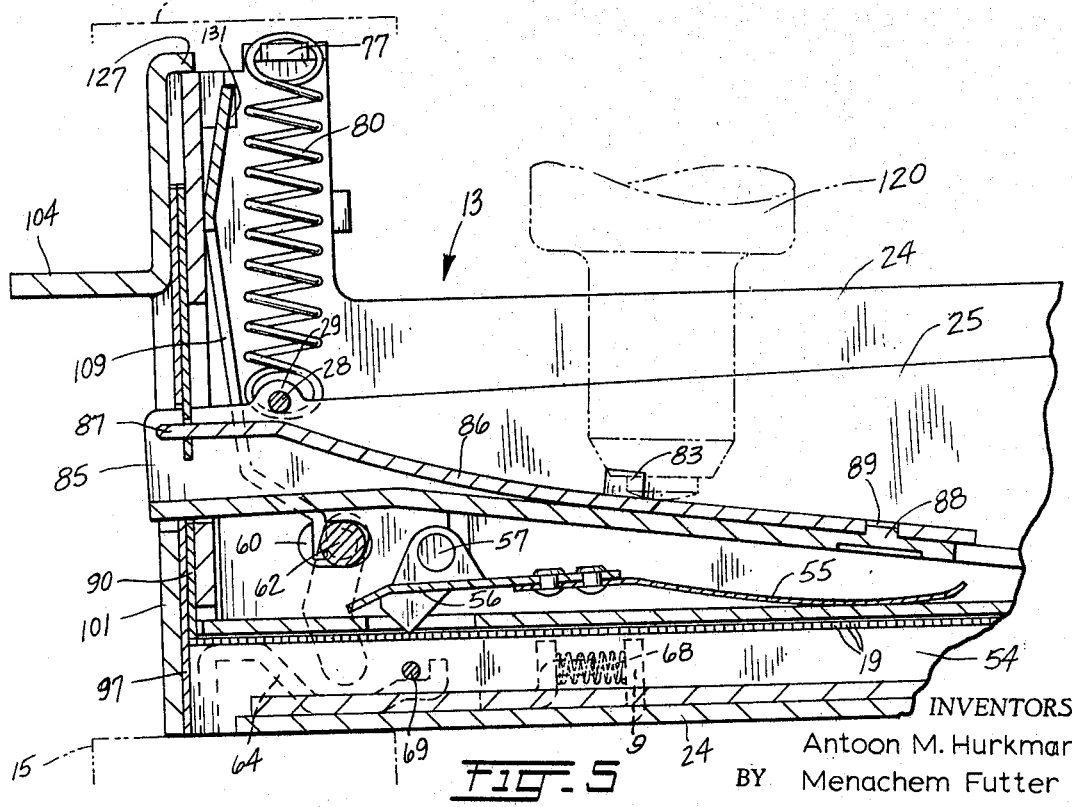

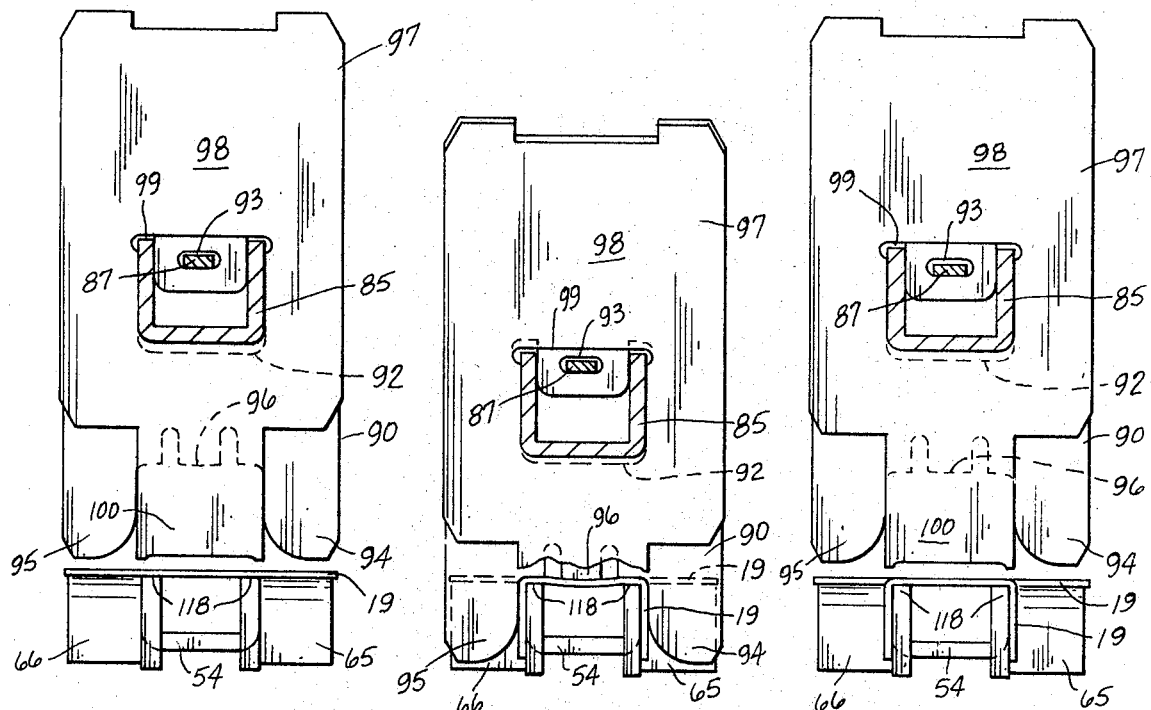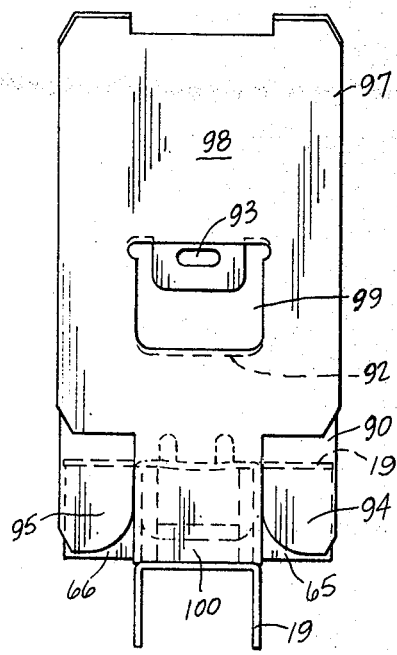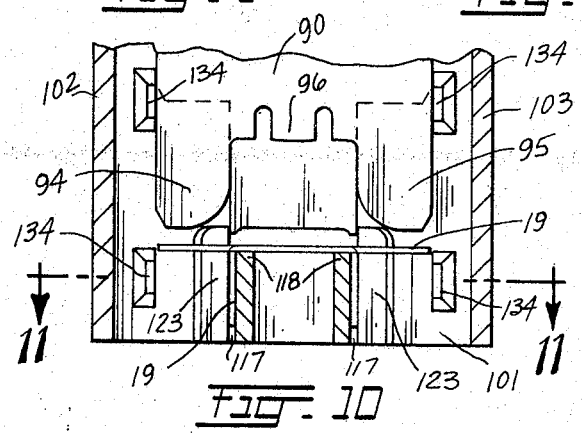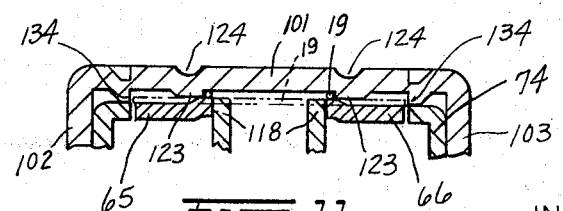

Aug. 18, 1970        A. M. HURKMANS ET AL        3,524,575
                    ELECTRIC STAPLING MACHINE
Filed March 30, 1967                          9 Sheets-Sheet 6

INVENTOR.
Antoon M. Hurkmans
BY  Menachem Futter

Attorney

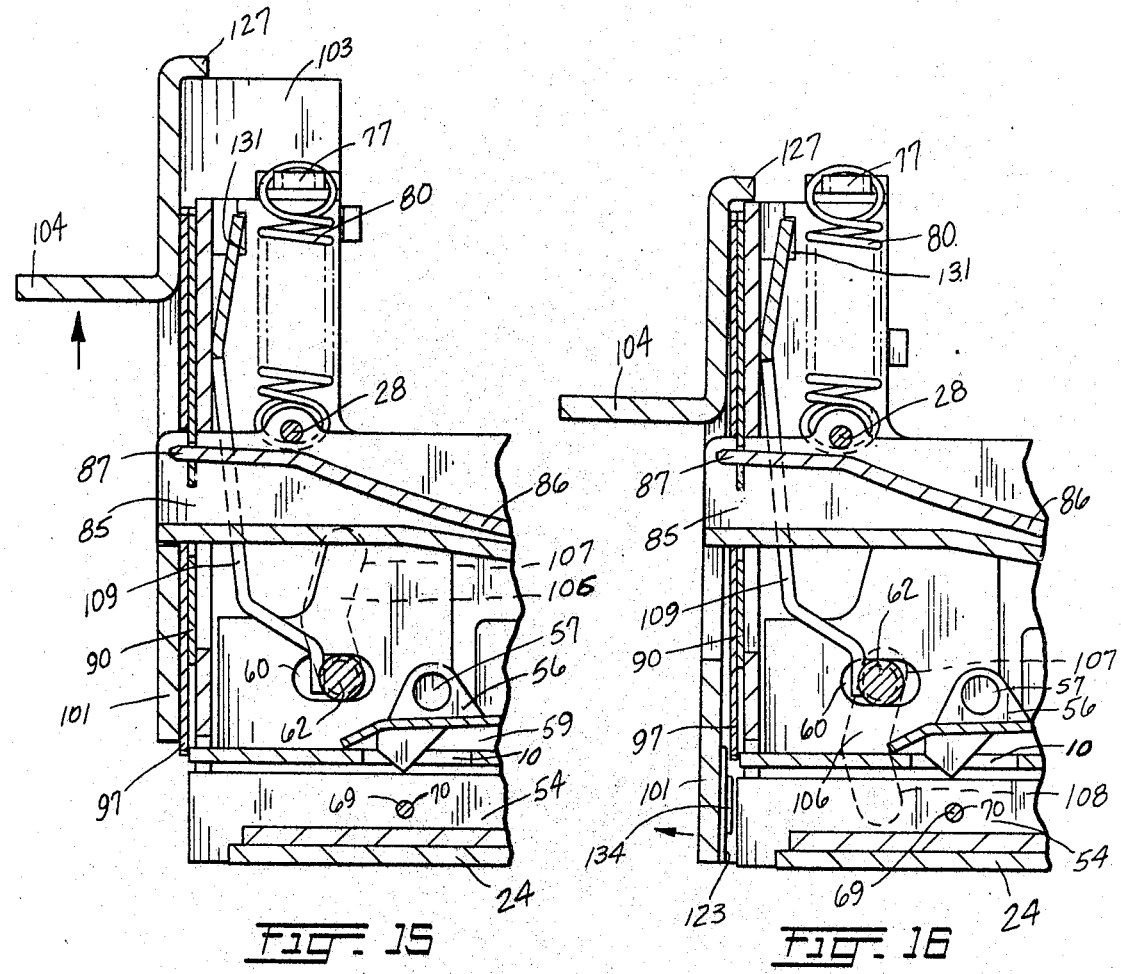

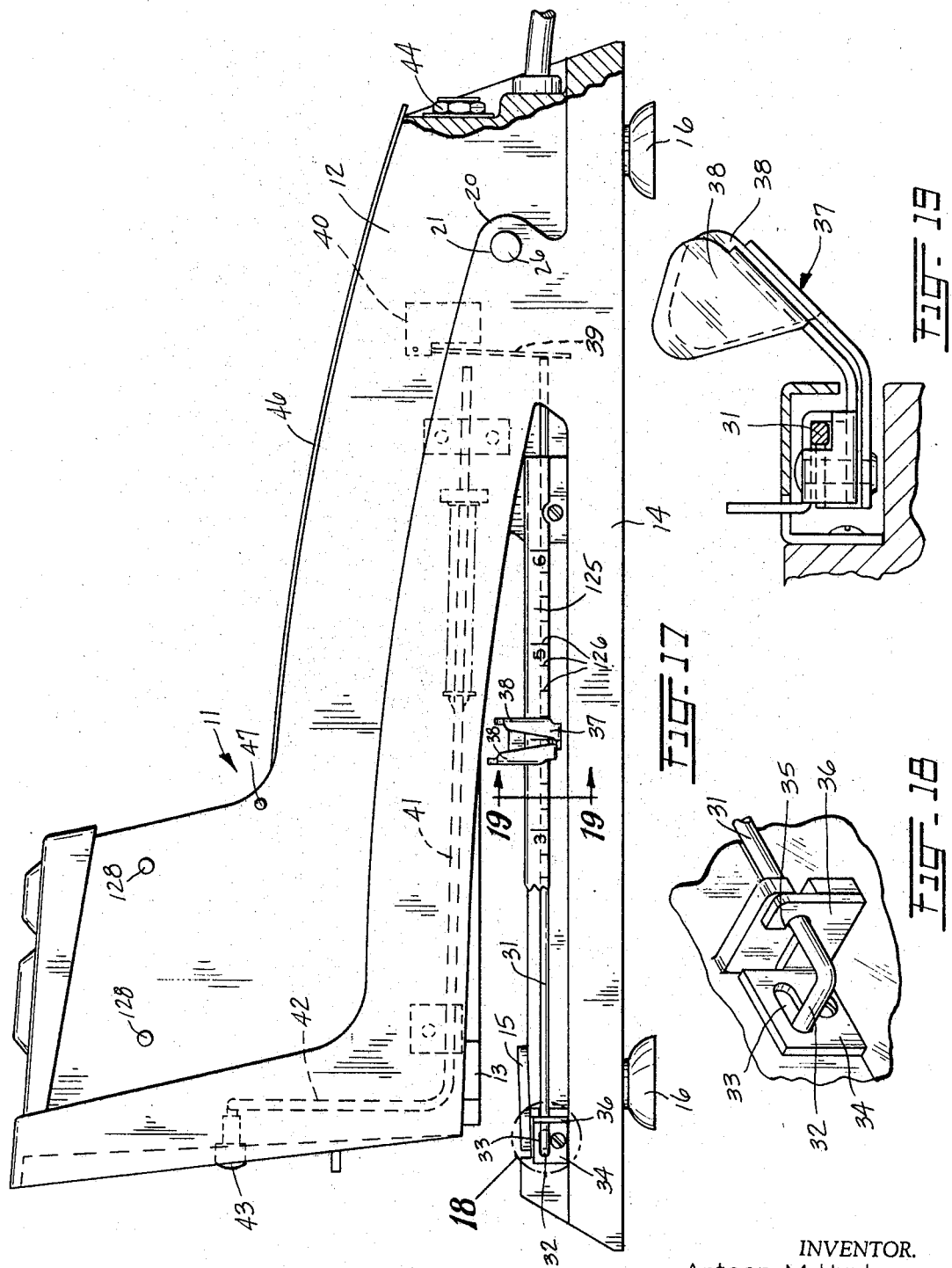

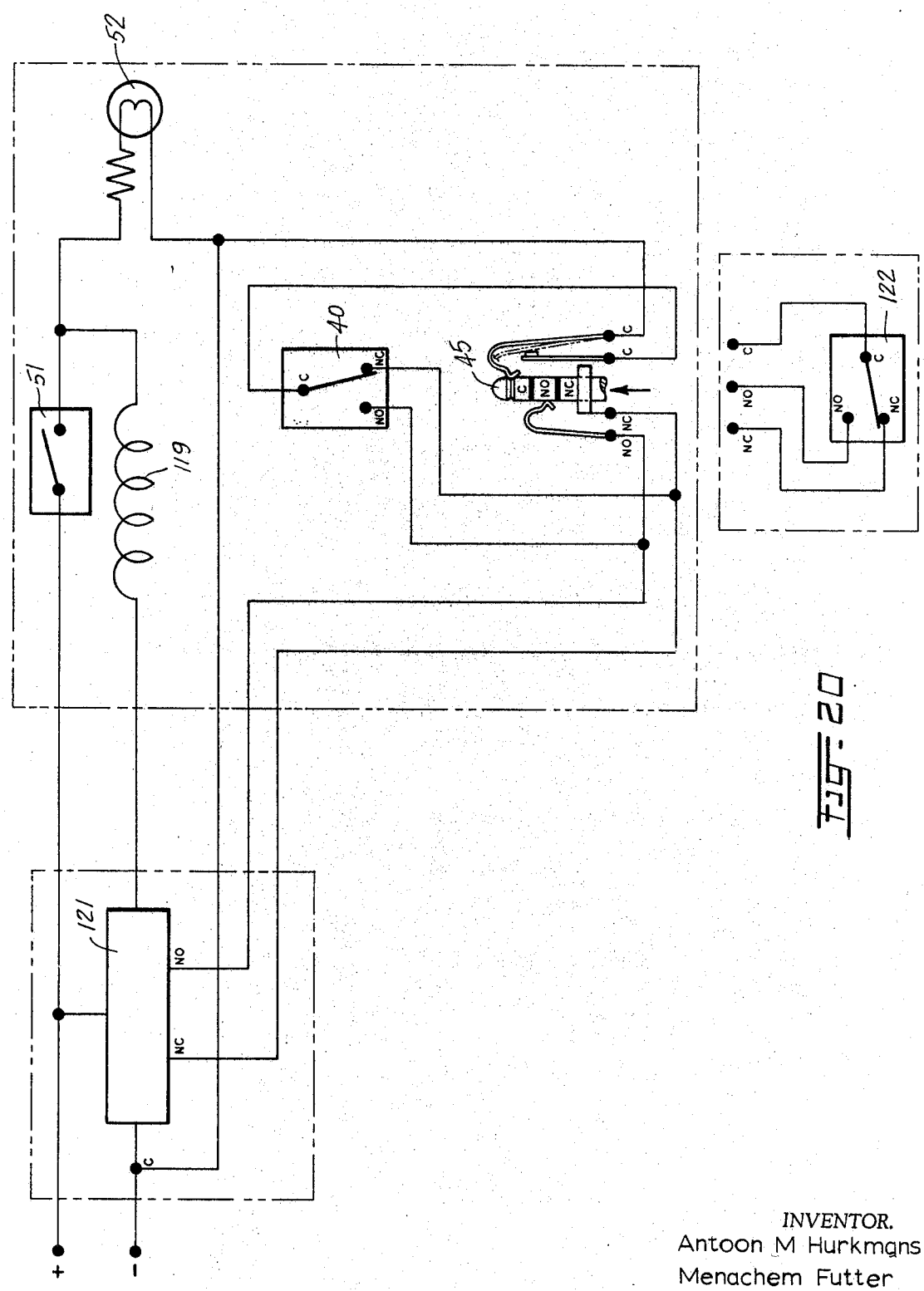

United States Patent Office 3,524,575
Patented Aug. 18, 1970

3,524,575
ELECTRIC STAPLING MACHINE
Antoon M. Hurkmans and Menachem Futter, Jamaica, N.Y., assignors to Swingline, Inc., Long Island City, N.Y., a corporation of New York
Filed Mar. 30, 1967, Ser. No. 628,229
Int. Cl. B27f 7/06
U.S. Cl. 227—7    12 Claims

ABSTRACT OF THE DISCLOSURE

An electrically operated stapling machine is shown having an operating element and a base pivotally connected thereto at one end thereof. The opposite end of the base is spaced from the operating element. Upon the spaced end of the base is an anvil which is inclined upwardly at a small angle. The angle of inclination of the anvil is such as to cause the anvil to be substantially parallel to the inclination of the operating element when the operating element strikes the anvil. The base carries a support for a roll of staple blanks secured to one another in laterally aligned relationship and a slidably movable trip lever. The operating element is surrounded by a housing which contains various operating parts of the device. The housing is formed with an openable cover adjacent the support for the roll of staple blanks. The cover is selectively retained in either open or closed position by a retainer spring. Operatively connected to the trip lever is a first switch element. The switch element is rendered inoperative when a jack is connected to a plug located within the housing. The jack is in turn connected to an auxiliary foot switch. The switch element can also be actuated by a hand control which is disposed within the housing and is connected to a button projecting from the forward end of the housing. A second main switch is provided to turn the machine on or off and an indicator light is present in series with the main switch.

A channel is provided for the staple blanks within the housing. At an intermediate point within the channel a spring loaded pivotally movable stop member is provided. This member will permit the staple blanks to travel forwardly but not rearwardly.

A front sheath is provided for the operating element. This sheath includes a projection which can be manually moved upwardly. The sheath is also provided with a pair of lateral recesses having two oppositely offset portions. An opening is also provided within the sheath of size to accommodate the crown of the formed staple but too small to accommodate the staple blank. This opening is partially defined by a pair of spaced coined depressions within the lower part of the sheath. Within the recesses is a transverse pin. Behind the front sheath is a driver blade, behind the driver blade is a former blade and behind the former blade is a back sheath. The driver blade, former blade and back sheath have mating recesses therewithin. Disposed within these mating recesses is the main control arm. This arm bears a pin thereupon to which three coil springs are secured. Two of these springs are secured to the back sheath and the remaining spring is secured to the housing. A leaf spring is also provided which bears a projection which passes through an additional recess within the former blade. Secured to the transverse pin is a leaf spring which also is operatively connected to the front sheath.

The main control arm is disposed within the outer control arm and is pivotally connected thereto. Within the outer control arm is a rail and a pair of cams are connected to the rail. Each cam is operatively connected to a leg of the staple formed by the former blade.

A solenoid is secured within the housing in operative relationship with a shock absorbing spring. The solenoid is formed with a plunger which abuts the leaf spring.

DESCRIPTION OF THE INVENTION

This invention relates to a stapling machine and is particularly designed as an electric stapling machine utilizing a belt of interconnected staple blanks in laterally aligned relationship. The belt, when used, is fitted into the machine in the form of a roll so that a large number (5,000 or more) of staples can be fitted into the machine in one load.

The invention set forth in this application is not specifically necessary to be employed in connection with such stapling machine but has separate utilization in the stapling and other arts in general. However, all of the features shown cooperate to produce an electric stapling machine considerably more superior to those presently on the market.

The novel features of this invention will be summarized below.

(1) The anvil employed to clinch the staple is inclined upwardly at an angle substantially equal to the angle between the stapling head member and the anvil when the stapling head member abuts the anvil. As a result, the front part of the driving mechanism is not embedded into the paper and thin papers can be effectively stapled without pushing the abutting portion through the top sheet of paper.

(2) The solenoid utilized to drive the driver blade of the machine is mounted with shock absorbing means. As a result, the solenoid delivers a smooth stroke rather than the sharp blow normally involved in this type of drive.

(3) Automatic trip means and manual trip means are both provided in the machine. Both trip means actuate the same switch but are separately utilizable. In addition, phone jack and plug means may be optionally employed which will disable both of the trip means. A foot switch can then be connected to the jack means.

(4) A sheath is provided in front of the driver blade but which is upwardly movable to expose the driver blade. As a result, any jam in the machine can be quickly and easily cleared.

(5) The former blade is connected to a spring which applies downward biasing pressure thereto. As a result, when the former blade forms a staple, it applies a smooth forming pressure since the staple itself applies a counterpressure against the spring.

(6) A portion of the former blade which abuts the crown portion of the formed staple is made in arcuate configuration so that the crown of the staple is formed into an arcuate configuration, thereby preventing springback of the formed staple.

(7) A raceway is provided adjacent the driver blade which is sufficient in size to accommodate the crown of the formed staple but not the staple blank. A pair of followers which are forwardly biased are adapted to abut the legs of the formed staple. When the staple is formed, the follower forces the formed staple into the raceway and thereby propels the entire staple belt forwardly. The raceway is preferably partially defined by two coined depressions which are located in the front part of the sheath. Thus, the raceway can be lifted clear of the driver blade when the sheath is moved upwardly.

(8) The sheath is pivotally movable with respect to its attached structure. As a result, if a jam occurs the sheath will pivot forwardly and will therefore not cause damage to the former and driver blades.

(9) Means are provided adjacent the staple belt to permit the staple belt to move forwardly but which prevent retrograde motion thereof.

(10) A cover is provided about the stapling head of the machine which is openable to permit insertion therein of a staple belt. Spring means are provided to permit the cover to be retained in either open or closed position.

The above sets forth a brief description of this invention and some of the objects and advantages thereof. Other objects and advantages of this invention will become apparent to the reader of this specification as the description proceeds.

The invention will now be further described by reference to the accompanying drawings which are made a part of this specification.

FIG. 2 is a side elevational view, partly in section, generally similar to that of FIG. 1 but with the cover of the housing in open position, the stapling head member in abutting relationship with the anvil, and the solenoid plunger driving the control member.

FIG. 3 is an exploded view of the component parts of the stapling head member of this invention.

FIG. 4 is a detail fragmentary enlarged cross sectional view through the stapling head of this invention, with the main arm spring removed for clarity of illustration. In this figure, the stapling head is in its normal rest position and the driving plunger of the solenoid is shown in phantom lines.

FIG. 5 is a view similar to that of FIG. 4 but with the stapling head in the position that it assumes in driving a staple.

FIG. 6 is a detail front view on an enlarged scale of the former and driver blades and associated structure showing the position of the parts just prior the former blade forming a staple to be driven in the next cycle.

FIG. 7 is a view similar to that of FIG. 6 but with a portion of the driver blade broken away for clarity of illustration and showing the position of the parts as the former blade forms a staple to be driven in the next cycle.

FIG. 8 is a view similar to that of FIG. 6 but showing the former blade clear of the formed staple, the formed staple propelled into the raceway, and the driver blade in position to drive the staple.

FIG. 9 is a view similar to that of FIG. 6 but with the spring and a portion of the control member removed for clarity of illustration and showing the formed staple driven and the next succeeding staple being formed.

FIG. 10 is a fragmentary sectional view taken along lines 10—10 of FIG. 4.

FIG. 11 is a cross sectional view taken along lines 11—11 of FIG. 10. This view specifically shows the staple raceway which is of sufficient size to accommodate the formed staple but not the staple blank. The former and driver blades in this view are shown in phantom lines.

Figure 1:
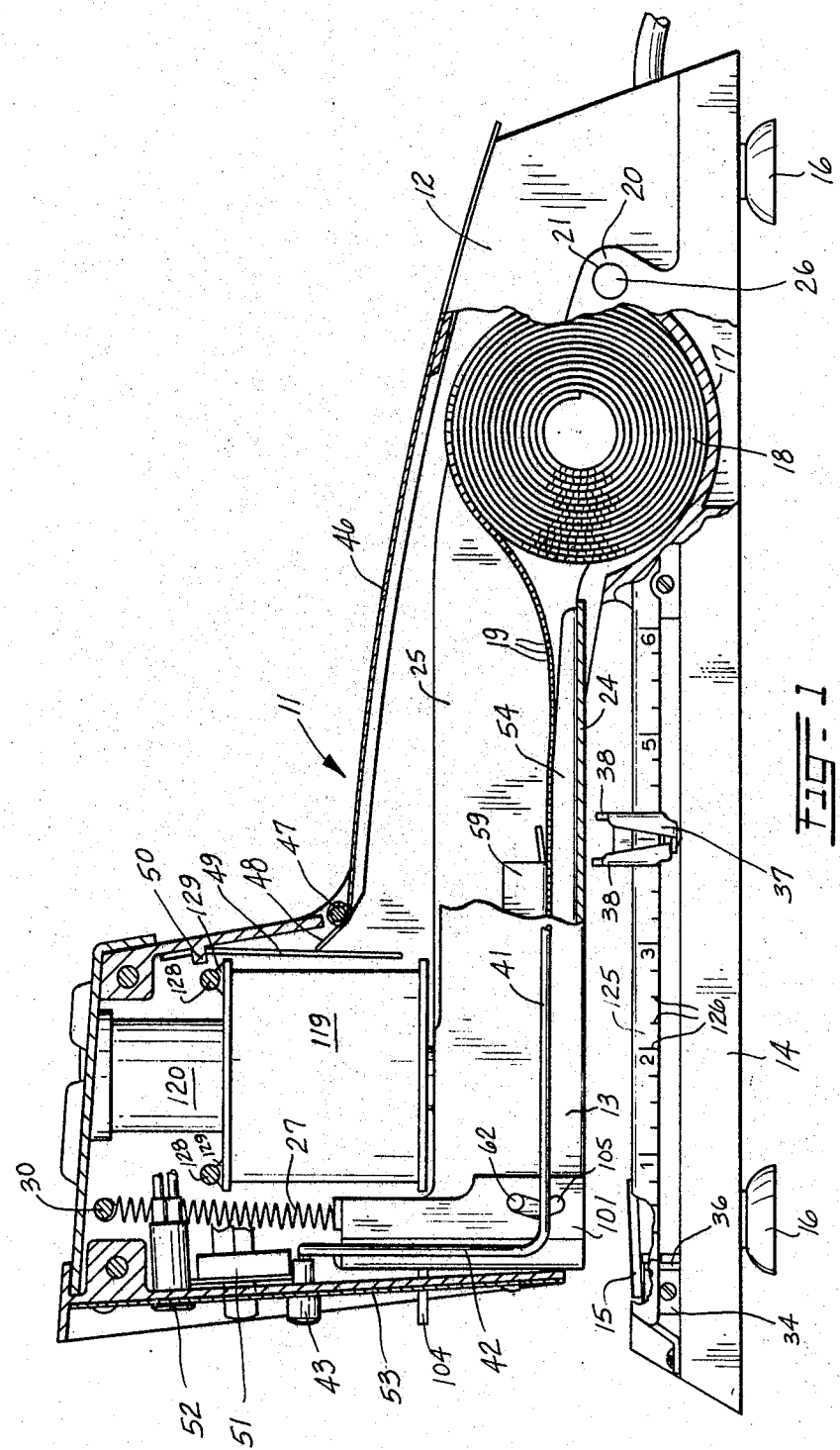
FIG. 1 is a side elevational view, partly in section, of an electric stapling machine made in accordance with this invention.
Figure 12:
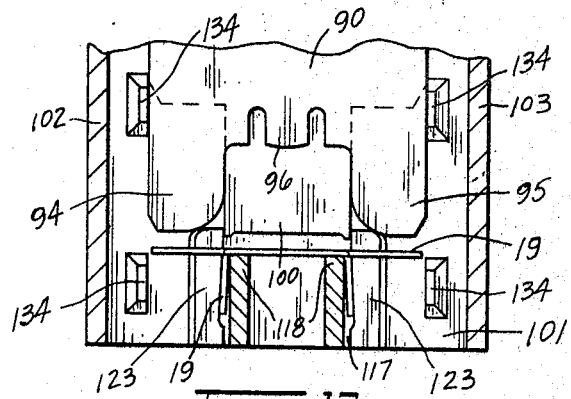

FIG. 12 is a view similar to that of FIG. 10 but showing an alternative design for the staple raceway, to permit staples to be accommodated therewithin if the legs of the staple should toe out after forming.

Figure 13:
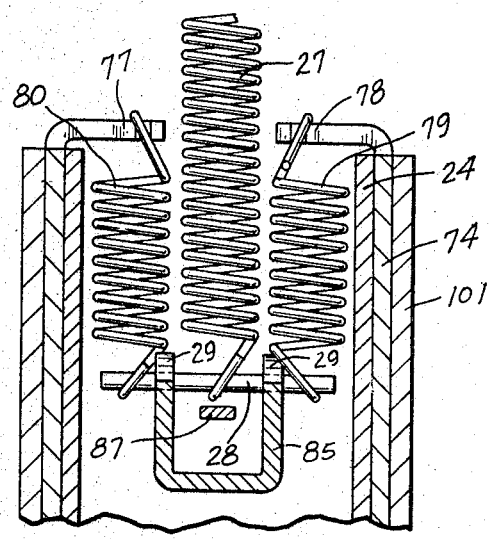

FIG. 13 is a cross sectional view taken along lines 13—13 of FIG. 4. In this view the spring arrangement involved is shown on an enlarged scale for clarity of illustration.

Figure 14:
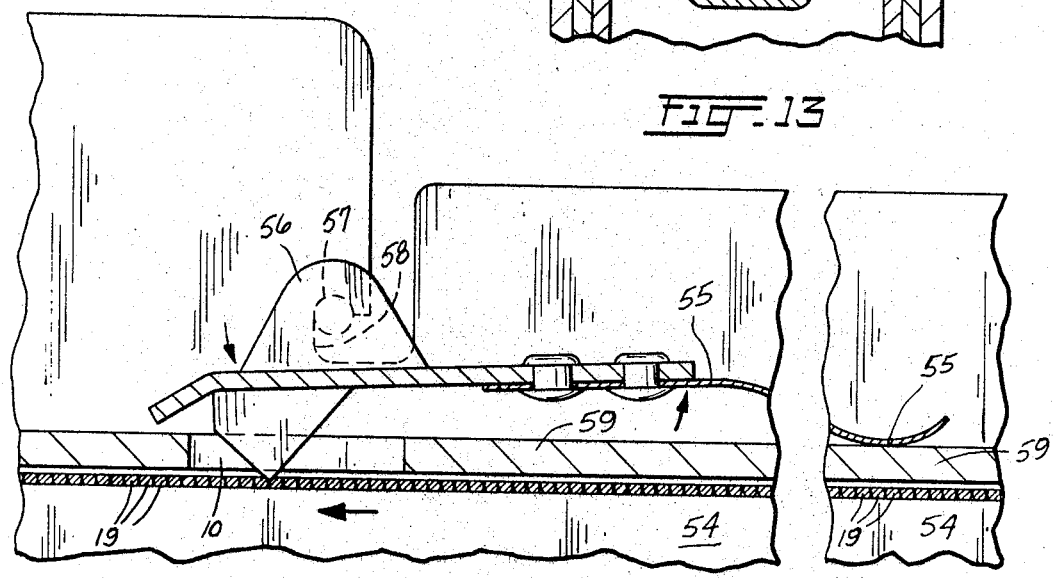

FIG. 14 is a detail sectional view, on an enlarged scale, of a portion of the mechanism shown in FIG. 4 which is utilized to prevent retrograde movement of the staple belt.

FIG. 15 is an enlarged sectional detail view of the sheath portion of the stapling head and associated structure. In this view the sheath portion is in raised position, showing the means provided to clear jams.

FIG. 16 is a view similar to that of FIG. 15 but showing the front sheath portion in normal operating position. This view also shows the pivotal movement of the front sheath which prevents damage to the former and driver.

FIG. 17 is a side view of the stapling machine made in accordance with this invention and particularly illustrates the automatic and manual tripping mechanisms employed in this invention.

FIG. 18 is a detail view of a portion of the tripper rod of this invention.

FIG. 19 is a sectional view taken along lines 19—19 of FIG. 17.

FIG. 20 is a circuit diagram of the electrical components of this invention.

The invention will now be further described by reference to the specific form thereof shown in the accompanying drawings. In this connection, however, the reader is cautioned to note that the specific form of this invention as shown in the specification and drawings herein is for illustrative purposes and purposes of example only. Various changes and modifications can obviously be made within the spirit and scope of this invention. The invention will now be described in detail by reference to the specific form thereof as shown in the drawings.

The stapling machine 11 of this invention is formed with a housing 12 which contains a stapling head member 13.

Stapling head member 13 is pivotally movable within housing 12. Housing 12 also includes a base portion 14.

Base 14 bears an anvil 15 which is upwardly inclined at an angle substantially equal to the angle between the stapling head member and the anvil when the stapling head member abuts the anvil as shown in FIG. 2. A pair of feet 16 depend downwardly from base 14.

Base 14 also carries an arcuate recess 17 which is designed as a support for a roll 18 of staple blanks. Roll 18 consists of a rolled belt of interconnected laterally aligned staple blanks 19.

Base 14 also includes a pair of upstanding ears 20 which are provided with mating apertures 21. Apertures 21 are adapted to register with mating apertures 22 and 23 which are disposed respectively in lower control portion 24 of stapling head member 13 and upper control member 25.

A pin 26 is disposed within the mating apertures to secure housing 12 and stapling head member 13 to base 14. Pin 26 also passes through apertures 22 and 23 to attach control portion 24 and control member 25 to one another. A spring 27 is secured to pin 28 which in turn is secured within ears 29 located in control member 25. The opposite end of spring 27 is secured to pin 30. Pin 30 is carried by the sides of housing 12. Stapling head member 13 is maintained in normal spaced relationship from anvil 15 by means of spring 27.

A trip rod 31 is formed with a forward offset portion 32 which in turn is slidable within slot 33 in support arm 34. Rod 31 is also guided within recess 35 located within support arm 36. Since slot 33 is elongated and larger than the corresponding portion of trip rod 31 that it accommodates, this provides a stroke limiting structure.

A guard member 125 is spaced from trip rod 31. Guard 125 bears measuring indications 126 thereupon. Lying along trip rod 31 is tripper 37 which is movable along rod 31 and retainable in position thereupon by springable arms 38.

The rear portion of trip rod 31 abuts switch lever 39 (FIG. 17) of switch 40 so that movement of trip rod 31 rearwardly will actuate switch 40. A manual trip rod 41 is disposed within housing 12 and bears an offset portion 42 to which is secured a forwardly projecting button 43. Button 43 projects forwardly from housing 12 and permits manual operation of the machine.

A jack 44 is adapted to accommodate a plug 45. When plug 45 (FIG. 20) is inserted into jack 44, then switch 40 is rendered inoperative. Plug 45 is attached to a conventional foot switch which can be optionally used to operate the machine.

Disposed above belt roll 18 and within housing 12 is a pivotally movable openable door 46. Door 46 is secured to hinge 47 and further bears a projection 48. Projection 48 abuts leaf spring 49 which in turn is secured to the housing by a retainer 50. As a result of this structure, door 46 can be maintained in either open or closed position and is utilized to load the machine with a roll of staple blanks.

A main switch 51 is provided and an indicator light 52 is in series with switch 51 so that the operator of the machine will be aware of whether the machine is on or not. A decorator plate 53 is further provided to conceal the internal structure.

Lying within lower control portion 24 is support rail 54. Rail 54 is adapted to support the interconnected staple blanks unrolled from the roll. Above rail 54 is a leaf spring 55 to which is connected a pivotally movable actuator 56. Actuator 56 is adapted to prevent retrograde movement of the belt of interconnected staples. A part of actuator 56 passes through aperture 10 in support 59 (FIG. 14). Actuator 56 is secured in position by trunnions 57 which in turn extend into slots 58 located on support 59. Support 59 also bears apertures 60. Apertures 60 are alignable with corresponding apertures 61 located within lower control portion 24. A transverse pin 62 passes through apertures 60 and 61. Apertures 60 and 61 are longer than the abutting parts of pin 62 to permit flexion of spring 109.

Followers 63 and 64 are disposed upon opposite sides of rail 54. Follower 63 is formed with downwardly depending portion 65 and follower 64 is formed with a downwardly depending portion 66. Portions 65 and 66 are adapted to abut the legs of a formed staple, as will be subsequently explained.

Secured to follower 63 is coil spring 67 and secured to follower 64 is coil spring 68. Springs 67 and 68 urge the respective followers forwardly. The opposite ends of coil springs 67 and 68 are connected to portions 9 (FIGS. 4 and 5) carried by lower control portion 24.

A pin 69 is disposed within apertures 70 and 71 located in rail 54. Apertures 70 and 71 are registerable with apertures 72 and 73 located within lower control portion 24. Pin 69 is disposed within the mating apertures.

A rear sheath 74 is provided which is formed with a front face portion 75 which is provided with an aperture 76 therewithin. Rear sheath 74 is also provided with a pair of inturned hook portions 77 and 78. Coil springs 79 and 80 are secured at one end to pin 28 and at their opposite end to members 77 and 78. Rear sheath 74 also includes a pair of cut-out portions 81 and 82. Apertures 72 and 73 are also provided and pin 69 passes through these apertures. Cut-out portions 81 and 82 are adapted to accommodate pin 62.

Main arm upper control member 25 bears a forwardly projecting portion 85. A leaf spring 86 carries a forwardly projecting portion 87. Leaf spring 86 is connected to control member 25 by being in underlying relationship with respect to inwardly extending bosses 83 and 84 (FIGS. 3, 4 and 5) and also by upwardly extending extrusion 88 (FIGS. 4 and 5). Opening 89 in spring 86 abuts extrusion 88. The forwardly projecting portion 87 of spring 86 is also retained within aperture 93 within former 90 (FIGS. 6, 7 and 8). Portions 85 and 87 are also contained within recess 76 and project forwardly therefrom.

Former 90 is formed with a face portion 91 which in turn is provided with an aperture 92 and a slot 93 spaced therefrom. Former 90 also bears a pair of spaced projecting portions 94 and 95. Between 94 and 95 is an intermediate portion 96 which is of shallow arcuate configuration. Portion 85 fits within aperture 92 and portion 87 within slot 93 of former 90.

Forward of former 90 is driver blade 97 which is formed with a face portion 98 which is provided with aperture 99. Driver blade 97 also has driving portion 100. Portion 85 of member 25 fits into aperture 99 in driver blade 97.

Forward of driver blade 97 is front sheath 101 which is formed with a pair of lateral portions 102 and 103 and forwardly projecting handle member 104. Within portion 102 is slot 105 and within portion 103 is slot 106. Each of slots 105 and 106 are formed with a pair of interconnecting oppositely offset portions 107 and 108. Pin 62 is adapted to fit into slots 105 and 106. An inwardly inturned portion which acts as a detent 127 is provided upon sheath 101.

A spring 109 is formed with a pair of spaced portions 110 and 111. Portions 110 and 111 bear inwardly offset portions 112 and 13. Portions 112 and 113 are adapted to abut against pin 62.

An additional inwardly offset portion 114 is located at the opposite end of spring 109 and bears lateral projections 115 and 116. Portion 115 is supported in position behind member 74 and member 24 as shown in FIG. 4 and is held within recesses 130 and 131.

Adjacent driving element 100 of driver blade 97 is a staple raceway 117. This raceway 117 is defined by the front of rail 54 and sheath 101. Raceway 117 is of sufficient size to accommodate the crown portion of a formed staple but not the unformed staple element.

The forward end of rail 54 adjacent former 90 constitutes inside forming means 118. Former 90 and driver blade 97 are guided within a raceway which is formed between sheath elements 74 and 101.

A solenoid 119 includes a plunger 120 which is adapted to bear downwardly against spring 86 (FIGS. 4 and 5). Solenoid 119 is mounted on pins 128 which also carry and hold shock absorbing hanger springs 129.

A pulser control 121 is preferably utilized in the circuit as shown in FIG. 20 so as to permit only one-half cycle of current to go through the solenoid. A foot switch 122 may optionally be employed when plug 45 is engaged.

Base portion 24 is secured to rear sheath 74 by means of a plurality of tabs 132 which mesh within apertures 133. Tabs 132 are engaged with apertures 133 but are not welded thereto. As a result, any stresses in the weld of the other parts are thus relieved.

With the foregoing specific description of this invention, the operation thereof can now be explained.

Door 46 is opened and roll 18 placed in position on support 17. The staple blanks composing roll 19 are advanced forwardly along rail 54 to their most forward position, as shown in FIGS. 4 and 5. It is noted that actuator 56 will permit forward movement of the staple blanks composing the belt but will not permit retrograde movement. Door 46 is then closed and switch 40 actuated either through trip rod 31, manual trip 43 or foot switch 122. The operation of any of these switches will cause solenoid 120 to move downwardly which will in turn move upper control portion 25 downwardly which will move former 90 downwardly. As former 90 moves downwardly, it forms a staple having crown and leg portions. This staple is formed behind raceway 117 and, until the staple is formed, it cannot pass through this raceway. On the other hand, as soon as the staple is so formed its crown portion is now sufficiently small to pass into the raceway. As soon as this occurs, followers 63 and 64 push the legs of the staple involved into the raceway and thus move the entire belt forwardly the length of one staple. On the next stroke the driver blade will drive this staple through the work. Because of the inclination of anvil 15, the front portion of the stapling head will not be embedded into the work so that very thin material can be stapled together without damage.

In the event that the machine should jam, the raceway can be easily exposed by moving front sheath 101 upwardly. This can be easily accomplished by pushing handle 104 in an upward direction, which will cause pins 62 to follow the contour of slots 105 and 106 and will further maintain the sheath in the upward exposed direction for as long as desired. After the jam is cleared, sheath 101 can similarly be snapped into normal closed position.

The foregoing sets forth the manner in which the objects of this invention are achieved.

We claim:

1. A stapling machine comprising a housing, a stapling head member within said housing pivotally connected thereto, said housing including a base portion, an anvil upon said base portion, said stapling head member being abuttable with said anvil but normally spaced therefrom, said anvil being inclined upwardly at an angle substantially equal to the angle between said stapling head member and said anvil when said stapling head member abuts said anvil, a recess within said base adapted to accommodate a roll of interconnected laterally disposed unformed staple elements, a slidable trip member upon said base, a control switch operatively connected with said trip member, a pivotal openable door within said housing adapted to permit insertion of said roll of staple elements into said machine, a hinge member secured to said door, said hinge member bearing a first projection, a first leaf spring secured to said housing in spaced relationship from said door, said leaf spring having a second projecting portion abutting said first projection so that said door can be selectively retained in open or in closed position, said stapling head member also having a base portion, an elongated longitudinal rail within the base portion of said stapling head member adapted to support a plurality of staple blanks of said roll, a pair of followers on opposite sides of said rail, a first coil spring connected to each of said followers biasing said followers forwardly, each of said followers adapted to abut a leg of a staple formed from the foremost staple blank of said roll and to move said formed staples forwardly, a holding member above said rail, a pivotally movable lock member secured to said holding member and bearing against the staple blanks upon said rail preventing retrograde movement of said staple blanks, a control member pivotally connected to the base portion of said stapling head member, said control member having a forwardly projecting portion, a first pin upon said forwardly projecting portion spaced from the end thereof, a pair of second coil springs upon opposite end portions of said pin, a third coil spring upon said pin intervening said second coil springs, said third coil spring also secured to said housing as to bias said stapling head member upwardly, a second leaf spring secured to said control member, said second leaf spring having a forwardly extending projection, a first sheath having a front face portion provided with a recess therewithin and a pair of spaced inturned roof portions, each of said roof portions adapted to support an end portion of one of said second coil springs, said recess within said front face portion of said sheath adapted to accommodate said forwardly projecting portion of said control member and said forwardly extending projection of said leaf spring, a downwardly movable former blade forward of said rear sheath, said former blade having a front face portion provided with a first recess and a spaced second recess, said first recess adapted to accommodate said forwardly projecting portion of said control member and said second recess adapted to accommodate said forwardly extending portion of said leaf spring, a driver blade forward of said former blade having a front face portion provided with a recess therewithin, said recess adapted to accommodate said forwardly extending portion of said control member, a raceway of size sufficient to accommodate the crown portion of a formed staple but not an unformed staple adjacent the said driver blade, a front sheath forward of said driver blade, said front sheath having a handle member thereupon and a pair of opposite lateral portions, each of said lateral portions provided with a recess therewithin formed with oppositely extending offset portions, an additional recess within said base portion of said stapling head member in registration with said recesses within said front sheath, a second transverse pin within the registering recesses within said front sheath and said base portion of said stapling head, a third leaf spring having a pair of inwardly offset spaced inturned end portions connected to said second pin, said leaf spring also having an opposite inwardly offset portion and a laterally projecting end portion, a solenoid secured within said housing, a shock absorbing spring secured to said solenoid, a plunger depending from said solenoid, said plunger being selectively engageable with said second leaf spring, a second trip member carried by said housing, said second trip member being also engageable with said control switch, a main switch, an indicator light in series with said main switch, and a jack having means for rendering said control switch inoperative.

2. A stapling machine as described in claim 1 said front sheath also having an inturned portion at its upper end.

3. A stapling machine comprising a stapling head member having a lower control portion and a pivotally and downwardly movable upper control portion, rail means within said lower control portion adapted to support a plurality of staple elements, a drive channel at the leading end of said rail, a staple driver blade carried by said lower control portion and movable within said drive channel by downward movement of said upper control portion, and a pair of forwardly biased movable follower members on opposite sides of said rail adapted to abut portions of a staple element disposed upon said rail.

4. A stapling machine comprising a housing, a stapling head member within said housing, said stapling head member including a piovtally movable support arm and a driving arm overlying said support arm and pivotally connected thereto, a longitudinal rail for the support of a plurality of unformed staple blanks disposed within said support arm, a pair of forwardly biased followers slidably movable adjacent said rail, control means adjacent to said rail adapted to prevent retrograde movement of the staple blanks disposed thereupon but permitting forward movement thereof, means normally upwardly biasing said support arm and means normally upwardly biasing said control arm, a former blade and a driver blade connected with said driving arm, a front sheath normally covering said driver blade, a staple raceway within said front sheath accommodating said driver blade, said staple raceway being of a size sufficient to accommodate the crown of a formed staple but not an unformed staple, a solenoid adapted to actuate said driving arm and moving it downwardly, control means for selectively actuating said solenoid, and manual means for selectively moving said sheath upwardly and to retain it in said upward position.

5. A stapling machine as described in claim 4 including a housing having a base, said stapling head member being pivotally connected to said base and normally spaced therefrom, and an anvil connected to said base.

6. A stapling machine as described in claim 5 including an openable cover about said housing adjacent said support rail, and spring means carried by said housing for retaining said cover in open or closed position.

7. A jam clearing mechanism for a stapling machine comprising, in combination, a support member having a front portion, staple driving means including a driver blade reciprocatingly movable in adjacent relationship with said front portion of said support member, an axially movable sheath member having a pair of spaced inwardly disposed side portions normally disposed in front of and covering said driver blade, said sheath member also provided with two offset interconnected recesses on each side portion, a pin member extending across said sheath and disposed within said recesses, and spring means carried by said support member and connected to said pin, thereby permitting said sheath to be selectively moved into a position to at least partially expose said driver blade and to be retained in both normal and displaced position.

8. A jam clearing mechanism as described in claim 7 including a handle member carried by said sheath.

9. A jam clearing mechanism as described in claim 8 said spring being a leaf spring having a pair of spaced arms each having offset portion connected to said pin.

10. A stapling machine as described in claim 3 said staple drive channel being of a width substantially equal to the crown portion of a formed staple.

11. A stapling machine having a magazine, a drive channel within said magazine, a driver blade reciprocating movable within said drive channel to drive fastening elements from said magazine sequentially into work, a vertically movable sheath member disposed in front of said magazine and normally covering said drive channel, and spring means disposed behind said sheath and abuttable therewith, said spring means normally biasing said sheath into adjacent relationship with said drive channel but said sheath member being forwardly movable away from said drive channel when pressure of a fastening element is applied thereto so as to provide for self-clearing of said drive channel.

12. In a stapling device the improvement which comprises a support, a driver blade, a former blade, and a front sheath normally covering said former and driver blades, said support provided with a first slot therewithin, said front sheath having handle means thereupon and a pair of opposite side portions, each of said side portions of said sheath provided with a second slot having a pair of oppositely directed offset portions, a transverse pin having opposite end portions each lying within said first and second slots, leaf spring having an end portion abutting said pin and biasing said pin forwardly, and an intermediate portion of said leaf spring lying adjacent the inner wall of said sheath so that said sheath can be moved upwardly to partially expose said driver blade and to be selectively retained in said upward position.

References Cited

UNITED STATES PATENTS

| | | | |
|---|---|---|---|
| 1,945,377 | 1/1934 | Posnack | 227—123 |
| 2,267,990 | 12/1941 | Obstfeld et al. | 227—123 |
| 2,298,520 | 10/1942 | Vogel | 227—126 |
| 2,436,473 | 2/1948 | Gilas | 227—120 XR |
| 2,580,505 | 1/1952 | Balma | 227—123 |
| 2,784,406 | 3/1957 | Powers | 227—123 |
| 2,874,401 | 2/1959 | Kotkins | 16—145 |
| 2,928,094 | 3/1960 | Crooks et al. | 227—86 |
| 2,959,786 | 11/1960 | Peterssen | 227—86 XR |
| 3,029,436 | 4/1962 | Kufel et al. | 227—86 |
| 3,041,618 | 7/1962 | Ruskin et al. | 227—131 XR |
| 3,305,808 | 2/1967 | Widl | 335—250 XR |
| 3,345,546 | 10/1967 | Beltramo. | |

GRANVILLE Y. CUSTER, JR., Primary Examiner

U.S. Cl. X.R.

227—85, 123, 131